Figure 1:
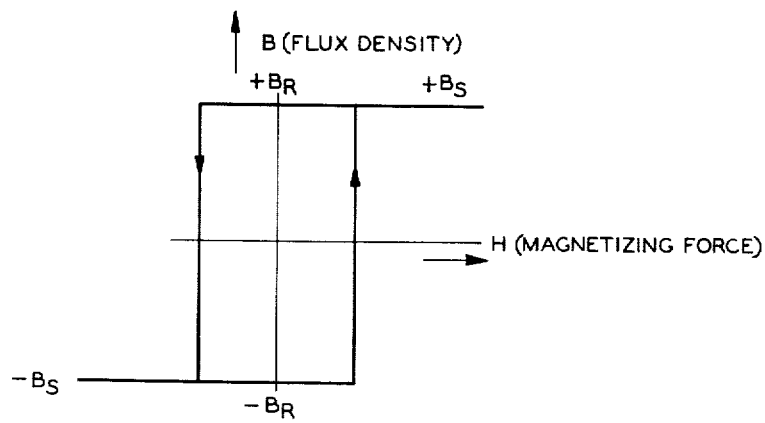

July 9, 1963  J. P. ECKERT, JR., ETAL  3,097,304
SIGNAL TRANSLATING DEVICE
Original Filed Sept. 24, 1953  6 Sheets-Sheet 1

INVENTORS
JOHN PRESPER ECKERT, JR.
THEODORE H. BONN
BY
ATTORNEY

July 9, 1963  J. P. ECKERT, JR., ETAL  3,097,304
SIGNAL TRANSLATING DEVICE
Original Filed Sept. 24, 1953                     6 Sheets-Sheet 2
FIG. 4
FIG. 5
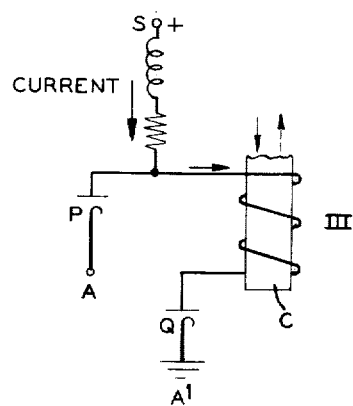
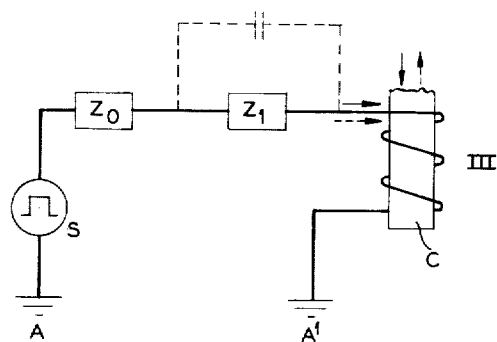
FIG. 6
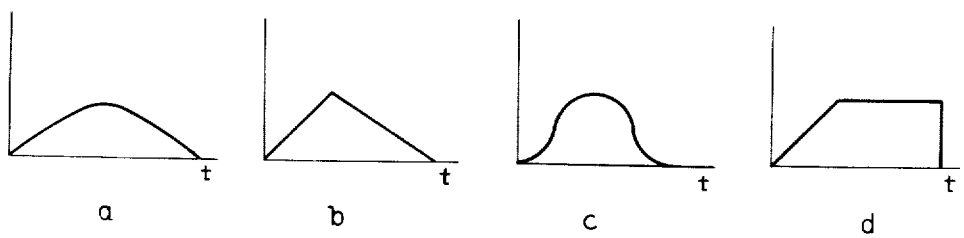
FIG. 7
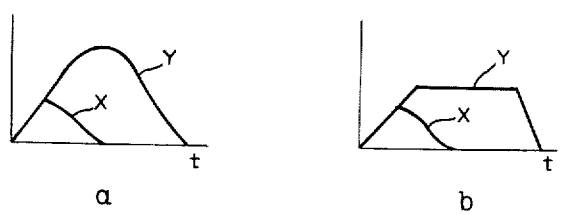
INVENTORS
JOHN PRESPER ECKERT, JR.
THEODORE H. BONN
BY
ATTORNEY July 9, 1963   J. P. ECKERT, JR., ET AL   3,097,304
SIGNAL TRANSLATING DEVICE
Original Filed Sept. 24, 1953   6 Sheets-Sheet 3

INVENTORS
JOHN PRESPER ECKERT, JR.
THEODORE H. BONN
BY
ATTORNEY

July 9, 1963

J. P. ECKERT, JR., ETAL 3,097,304

SIGNAL TRANSLATING DEVICE

Original Filed Sept. 24, 1953

6 Sheets-Sheet 4

*INVENTORS*
JOHN PRESPER ECKERT, JR.
THEODORE H. BONN
BY

*Sheldon Kyanston*

ATTORNEY

July 9, 1963 J. P. ECKERT, JR., ETAL 3,097,304
SIGNAL TRANSLATING DEVICE
Original Filed Sept. 24, 1953 6 Sheets-Sheet 5

INVENTORS
JOHN PRESPER ECKERT, JR.
THEODORE H. BONN
BY

ATTORNEY

July 9, 1963

J. P. ECKERT, JR., ETAL 3,097,304

SIGNAL TRANSLATING DEVICE

Original Filed Sept. 24, 1953

6 Sheets—Sheet 6

INVENTORS
JOHN PRESPER ECKERT, JR.
THEODORE H. BONN
BY

*Sheldon Kyuelen*

ATTORNEY

United States Patent Office 3,097,304
Patented July 9, 1963

3,097,304
SIGNAL TRANSLATING DEVICE
John Presper Eckert, Jr., Gladwyne, and Theodore H. Bonn, Merion Station, Pa., assignors to Sperry Rand Corporation, New York, N.Y., a corporation of Delaware
Original application Sept. 24, 1953, Ser. No. 382,180. Divided and this application Jan. 6, 1959, Ser. No. 785,263
6 Claims. (Cl. 307—88)

This application is a division of our copending application Serial No. 382,180, filed September 24, 1953, now Patent No. 2,892,998.

The invention disclosed herein relates to pulse-type magnetic amplifiers and more particularly to such amplifiers which produce a steady output. It is well known that pulse-type magnetic amplifiers produce an output signal the duration of which is a function of the volt-seconds of the signal or power pulse applied to the amplifier. However, often it is highly desirable for such an amplifier to produce an output signal of greater duration. To this end this application discloses apparatus connected to the load of a magnetic amplifier for stretching the output tsignal produced thereby. Further, this application teaches that applied signals exceeding a predetermined volt-seconds relationship will produce a standard output signal, that is, once the core comprising the magnetic amplifier is caused to traverse its hysteresis loop due to the applied signal no further output will be observed.

As disclosed in our parent application these amplifiers may employ ferromagnetic materials. Such materials exhibit a hysteresis loop and in conjunction with a coil of wire displays a high impedance when operating over the portion of the loop from minus residual flux density to plus residual flux density and show a low impedance when traveling from plus residual flux density towards plus saturation flux density. Use can be made of these effects for signal translating and amplifying purposes. A way of using this effect is to produce the desired output when and while the core occupies the high impedance portion of its hysteresis loop. The present invention covers the output circuits of such devices using this effect.

It is therefore an object of this invention to provide a new magnetic apparatus.

Another object of this invention is to provide a new magnetic apparatus for limiting current pulses by taking advantage of the hysteresis characteristics of the magnetic materials in the apparatus.

Another object of this invention is to provide a new magnetic apparatus including an integrating network for limiting current pulses by taking advantage of the hysteresis characteristic of the magnetic materials in the apparatus and the pulse stretching attributes of the integrating network.

A further object of this invention is to provide a new signalling apparatus which produces an output that is constant in amplitude and duration.

Figure 2:
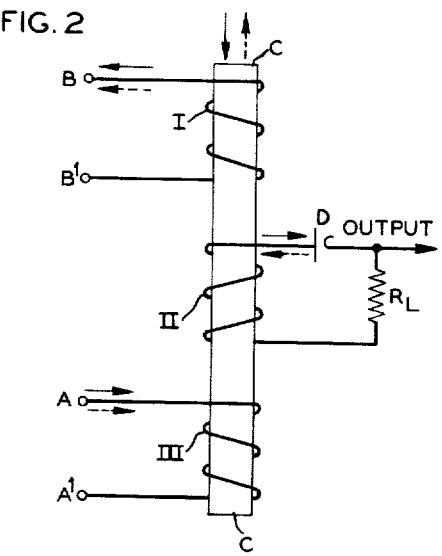
Figure 2A:
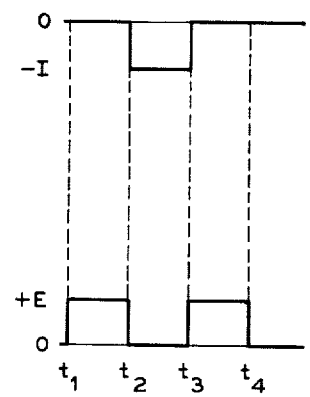
Figure 3:
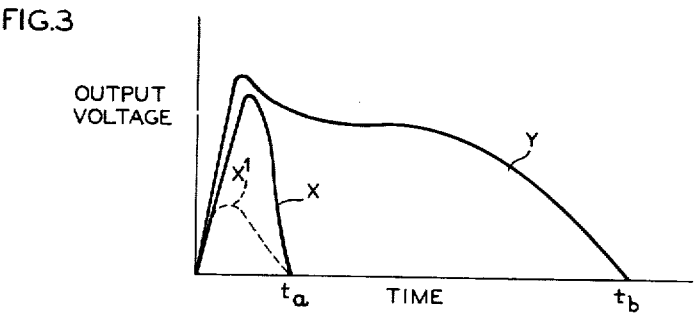
Figure 8:
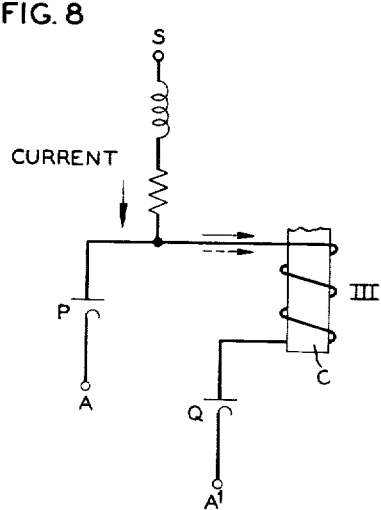
Figure 9:
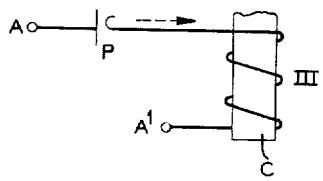
Figure 9A:
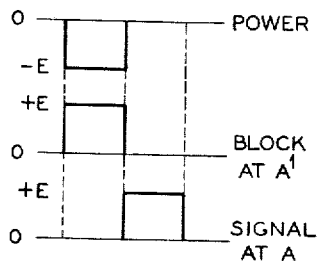
Figure 8A:
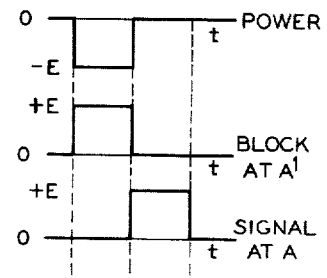
Figure 8B:
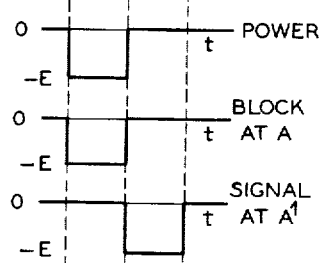
Figure 8C:
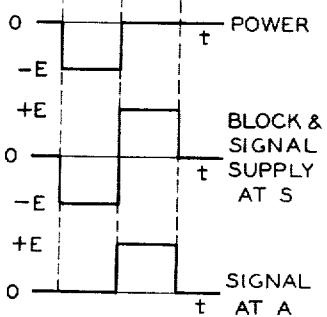
Figure 10:
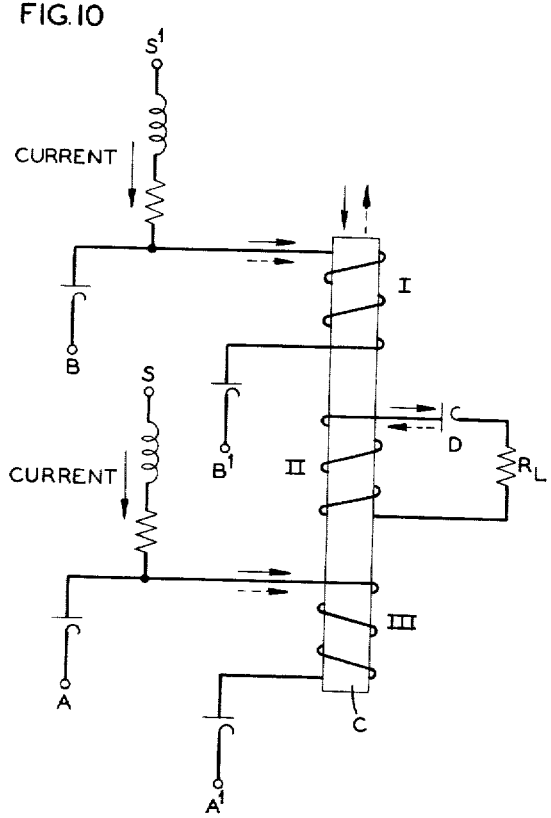
Figure 10A:
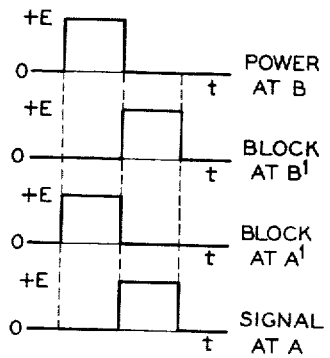
Figure 11:
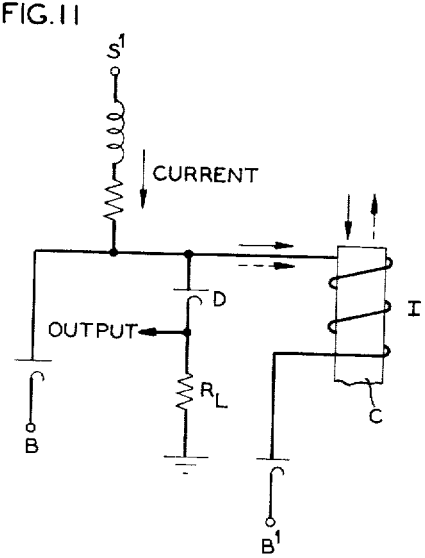
Figure 11A:
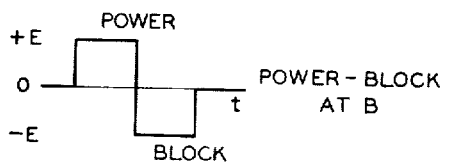
Figure 12:
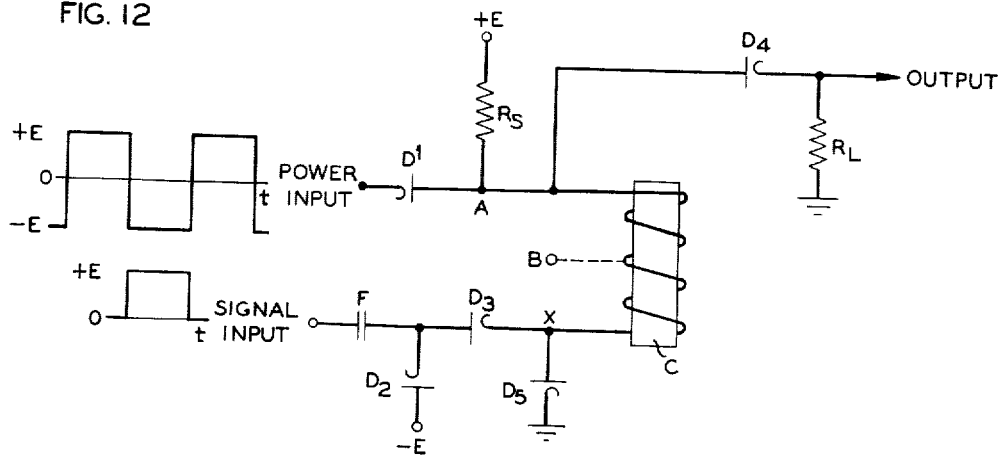
Figure 13:
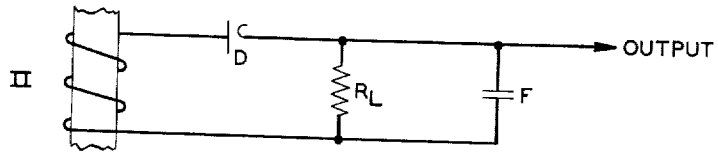
Figure 13A:
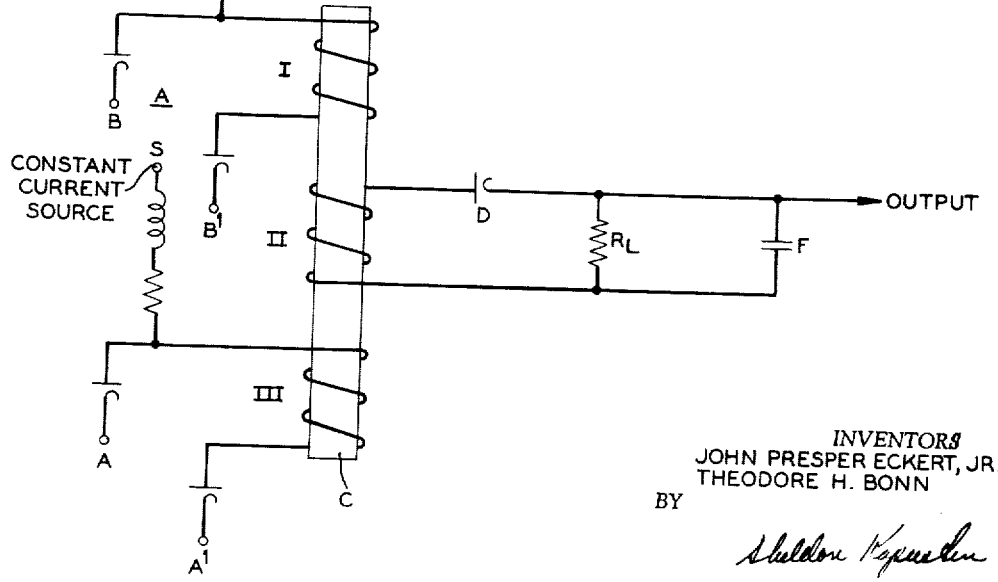
Figure 14:
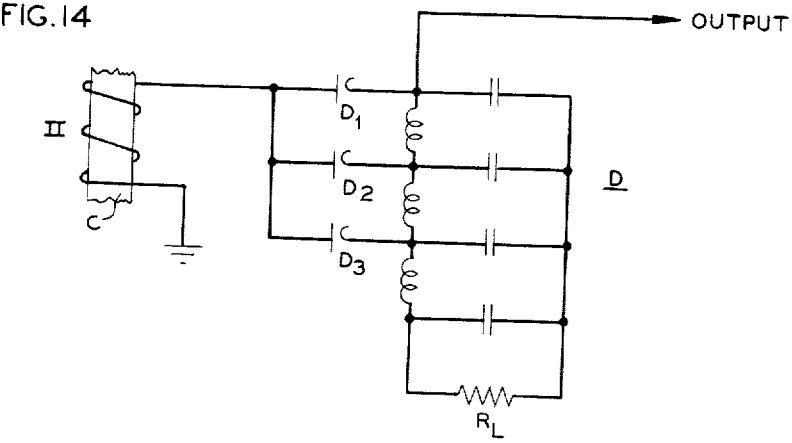
Figure 14A:
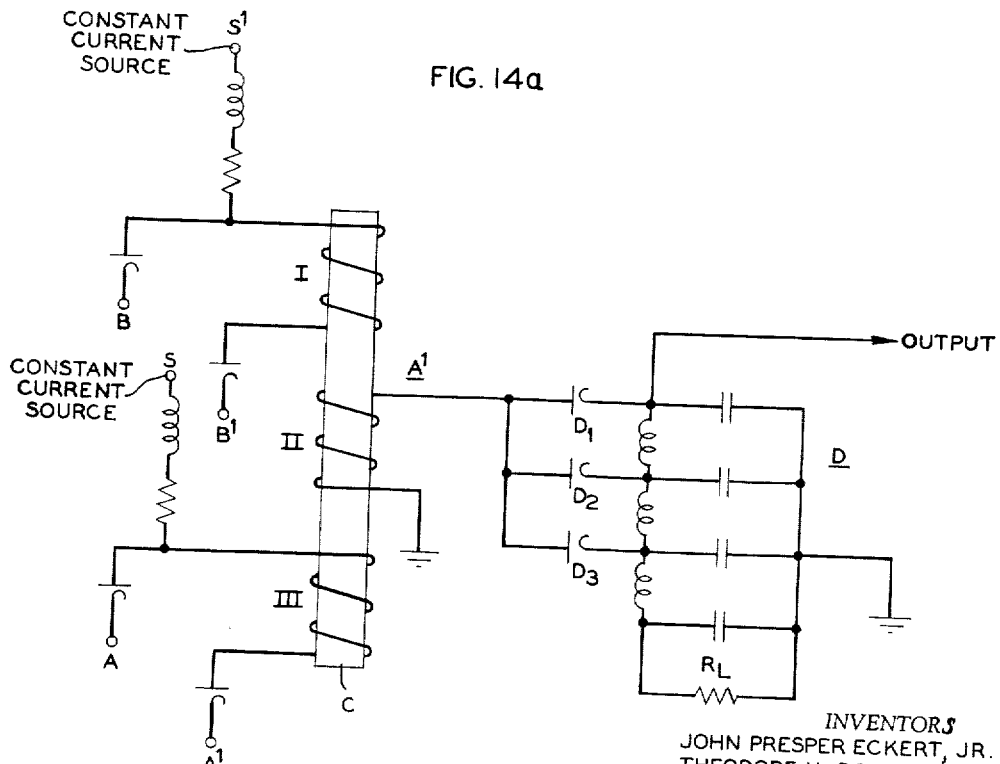

Other objects and advantages of the invention will become apparent from the following description and the accompanying drawings in which:

FIGURE 1 is a diagram of an idealized hysteresis loop;
FIGURE 2 shows a basic circuit of a solid-state signal translating device;
FIGURE 2a illustrates the operating time cycle for the embodiment of FIGURE 2;
FIGURE 3 illustrates some representative output wave forms;
FIGURE 4 shows an input winding with a constant current input;
FIGURE 5 shows an input winding with a constant voltage input;
FIGURE 6 illustrates some typical shapes of power pulses;
FIGURE 7 shows output wave forms produced by some of the power pulses illustrated in FIGURE 6;
FIGURE 8 shows an input winding to be used in connection with the application of a constant current and the use of diodes and blocking pulses;
FIGURE 8a represents a first operating time cycle for the circuit of FIGURE 8;
FIGURE 8b represents a second operating time cycle for the circuit of FIGURE 8;
FIGURE 8c represents a third operating time cycle for the circuit of FIGURE 8;
FIGURE 9 illustrates an input winding to be used in connection with the application of a constant voltage;
FIGURE 9a shows the form of pulses to be applied to the circuits of FIGURE 9;
FIGURE 10 illustrates the three windings of a magnetic signal translating device to which D.C. power sources may be applied;
FIGURE 10a shows the pulse forms to be used in connection with the arrangement of FIGURE 10;
FIGURE 11 illustrates an arrangement in which the output is directly connected to the power winding;
FIGURE 11a shows a wave form which serves both as a power pulse and as a blocking pulse;
FIGURE 12 exemplifies the circuits of a single coil magnetic signal translating device;
FIGURES 13 and 13a illustrate a first example of an output winding with a circuit arrangement for obtaining a steady output;
FIGURES 14 and 14a show a second example of an output with a circuit arrangement for obtaining a steady output.

FIGURE 1 illustrates an idealized hysteresis loop of a material which may be used as the core member for the solid-state signal translating devices to be described. $B_R$ signifies residual flux density and $B_S$ designates saturation flux density. The core material may be made of a variety of materials amongst which are the various types of ferrites and the various kinds of ferromagnetic alloys, including Orthonik and 4–79 Moly-Permalloy. These materials may have different heat treatments to give them different properties. In addition to the wide variety of materials applicable, the cores of the signal translating devices may be constructed in a number of different geometries involving both closed and open paths. For example, cup-shaped cores, strips of material or toroidal cores are possible.

It is to be understood that the invention is not limited to any specific geometries of the cores nor to any specific materials therefor, and that the examles given are illustrative only. The only requisite is that the material possesses a hysteresis loop preferably approaching the idealized hysteresis loop as shown in FIGURE 1.

Before describing the signal translating devices, the terms to be used in regard to different kinds of electric pulses will be defined. There are clock pulses and signal pulses usually supply the power for the operation of the therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

FIGURE 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the waveform of FIGURE 2a to the right of terminal B. This power pulse causes a current to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The waveform of FIGURE 2a to the right of terminal A is a typical waveform which might be applied to terminal A. The vertical lines connecting the waveforms of FIGURE 2a indicate the time relationship between the signal input pulse, which may or may not be present at terminal A, and the power pulse which occurs at terminal B.

The idealized BH loop of FIGURE 1 is a convenient means for describing the method of operation of the signal translating device. First, it will be assumed that there are no information pulses and that the power pulse is in such a direction as to drive core C from plus $B_R$ in to plus $B_S$. In this event, there is a small flux change in the core, and hence an output voltage will be generated which, as a rule, is short in duration and, in the case of some materials, also small in amplitude (sneak pulse).

FIGURE 3 shows representative output waveforms. Waveforms X and $X^1$ are the types which would occur in the case just discussed, namely in the absence of an information pulse preceding the power pulse. The exact size and shape of these waveforms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to 0, it left the core in the plus $B_R$ position. The information pulse causes the material to travel from plus $B_R$ to minus $B_R$ in a counter-clockwise direction around the hysteresis loop. There is a large change of flux. Any currents which tend to flow in circuit II, the load circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, FIGURE 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, FIGURE 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse, known as the sneak pulse and shown at X or $X^1$ in FIGURE 3, may be tolerated in any practical situation. Another important factor is represented by the ratio of the slope on the step portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X and $X^1$ in FIGURE 3 results across $R_L$. When a signal pulse has been received, the material moves from plus $B_R$ to minus $B_R$; an output as Y in FIGURE 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce the desired output signal in response to the application of an input signal, regardless of the fact that the power, current or voltage ratio may be greater than, equal to or less than unity. If, in contrast thereto, the desired output signal is produced in response to the non-application of an input signal, then the device will be called a "complementer."

It also should be realized that the device illustrated in FIGURE 2 as all the other devices described hereinafter operate as so-called "parallel" magnetic amplifiers or complementers. This means that the load circuit or circuits are arranged in a parallel relationship to the core when viewed from the power source, the power being supplied, in the average case, by a constant current source. The desired output signals are produced, therefore, through changes in the residual flux density which, as a rule, follow the path of the hysteresis loop and keep the core within the high permeability region, i.e., between plus and minus $B_R$.

In FIGURE 2, the load on circuit 2 is shown as a resistor. However, this might very well be any passive or active network including resistors, capacitors, inductors, any conceivable combination thereof, computing circuits, buffers, gates and other amplifiers.

In the waveforms illustrated in FIGURE 2a, the power pulse is shown occurring coincident with the end of the signal pulse. The time period $t_1$ marks the beginning of the signal pulse, $t_2$ marks the end of the signal pulse and the beginning of the power pulse, and $t_3$ marks the end of the power pulse. Actually, $t_1$, $t_2$ and $t_3$ mark the boundaries of the periods allotted to the signal and power pulses and by no means indicate the length of these pulses. The period $t_1$ to $t_2$ may be a relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose waveform can be accurately fixed, output pulses from this amplifier are of standard waveforms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In FIGURE 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuit will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is compartively high with respect to the load, and a constant voltages source is a source whose impedance is comparatively low with respect to the load.

FIGURE 4 represents a constant current input source which can be used with this type of amplifier. The portion of the core C shown corresponds to coil III of FIGURE 2. The directions of the currents, voltages, and fluxes shown are the same as those in FIGURE 2. Normally, when no signal is applied to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This principle is also applicable to the means for producing the power pulse. In this case, the actual source would be the D.C. source of constant current and the source of switching pulses which cause this current to flow in coil III at the required time.

FIGURE 5 shows a constant voltage type of input in which the signal source S is theoretically an impedance-less source. The same portion of the core C as in FIGURE 4 is shown here. $Z_0$ is the internal impedance of a practical source and $Z_1$ is an impedance placed in series with the input coil III of the amplifier. The signal source S is selectively actuated to apply an input pulse. By placing a capacitor, shown dotted, across $Z_1$ a faster change in current can be obtained.

In the previous descriptions, both the signal and the power pulse were shown as square waves. In practice, many waveforms are possible. It is essential, however, that the signal pulse, if selectively applied, is present during the signal period. Whether or not this signal impulse may extend into a power pulse period, depends upon the characteristics of the other elements in the over-all circuit system within which this amplifier is to be used. If the time integral of the signal voltage during the signal period is equal to or greater than $2 \times 10^{-8}$ $B_R A N$ volts (where A is the area of the magnetic circuit in square centimeters, $B_R$ is in gauss and N the number of turns), then full output is obtained from the amplifier. If, on the other hand, the time integral of the signal voltage is less than $2 \times 10^{-8}$ $B_R A N$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

FIGURE 6 shows some typical shapes of power pulses which might be used. FIGURE 6a shows a half sine wave; FIGURE 6b shows a triangular wave; FIGURE 6c shows a Gaussian curve; and FIGURE 6d shows a flat-top pulse with unequal rise time and fall time. The main considerations in determining the shape of the power pulse are the effect of its shape on the sneak pulse and output pulse, and the back voltage applied to the diode in series with the load resistance at the time that the power pulse returns to zero. Usually, with the materials used, the greatest change of flux between $B_R$ and $B_S$ occurs near $B_R$. Therefore, if the power pulse is made to travel slowly over this region, the sneak pulse would be of lower amplitude during the lower rise; the output would also be smaller, though. If a power pulse as shown in FIGURE 6c is used, the output and sneak pulse will be as illustrated in curves Y and X, FIGURE 7a, respectively. If the waveform as shown in FIGURE 6d is used, the output and sneak pulse will be as shown in curves Y and X, FIGURE 7b, respectively.

One of the important problems connected with these amplifiers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

FIGURE 8 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in FIGURE 2 is redrawn in FIGURE 8. A similar arrangement may be used for the power circuit, but the diode corresponding to diode P would not be necessary in such a case, provided that the point corresponding to point S is connected to a device which prevents any back flow of current. The waveforms applied in one method of using this principle are shown in FIGURE 8a. The pulse applied to the power winding is shown. At the same time, a positive pulse is applied to point $A^1$ from a blocking source. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a signal pulse is applied to point A. FIGURE 8b shows an alternate method for accomplishing this result. Here the blocking pulse is applied to the point A and the signal to point $A^1$. In this case, the polarities of both the blocking pulse and the signal are negative.

Another method for accomplishing the same thing is shown in FIGURE 8c. The power pulse is the same as previously described. Now, however, a waveform as shown in the second line is applied to terminal S. This waveform is called the block and signal supply because it is of the correct polarity to block during the power pulse period, and it can supply power to the signal winding in the event that a waveform, as shown in the last line, appears at point A. Point $A^1$ would be grounded in this case, and diode P may be eliminated.

FIGURE 9 shows a method of isolating the power pulse from the input when using a constant voltage source. Here again only coil III and part of core C, as in FIGURE 2, are shown. A power pulse is applied as shown in FIGURE 9a. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the bottom waveform of FIGURE 9a is selectively applied at point A.

FIGURE 10 shows both D.C. power sources and blocking pulses which can be used on both power and signal windings in an amplifier. A power pulse is applied as shown at point B and the constant current from $S^1$, which normally would flow to B, is made to flow through coil I. Similarly, a blocking voltage is applied at point $A^1$. During the signal period, a positive signal pulse is applied to terminal A and the current from S, which normally would flow through A, is made to flow through coil III. A positive blocking voltage is applied at point $B^1$. Note that if a signal pulse does not occur, the block is applied anyhow so that the signal source does not have to supply power required to block. The application of the block in no way harms the operation of the amplifier.

In the preliminary description of the operation of the amplifier, the output winding was shown as a separate winding II of FIGURE 2 and other figures. However, it is not necessary that this be so. The output may be connected as shown in FIGURE 11, i.e., across the power winding I with the diode D in series with the load $R_L$. The input and output waveforms are the same as shown before. The previously discussed principles, for example, those of FIGURE 10, can be still applied to this circuit. A block such as applied at $B^1$, FIGURE 10, can also be applied at $B^1$, FIGURE 11. A power pulse can be applied at B, FIGURE 11, or if terminal B is eliminated, it can be applied at point $S^1$, as described in connection with FIGURE 8c. The power pulse applied at B may also serve as a blocking pulse if it is allowed to go negative, as shown in FIGURE 11a. In this case point $B^1$ would be grounded.

A magnetic amplifier may be constructed having only one coil on a core of ferromagnetic material. An example of a single coil magnetic amplifier is shown in FIGURE 12. This amplifier has a constant current applied via resistor $R_S$. During the power period, when the power input has a positive pulse applied thereto, diode $D_1$ cuts off and current flows through resistor $R_S$, the amplifier coil and diode $D_5$, in series and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

A voltage gain may be obtained from this amplifier by connecting diode $D_3$ to point B instead of point X as shown. In this case it will require less voltage (although more current) to reset the amplifier from plus $B_R$ to minus $B_R$.

In the magnetic amplifiers previously described, it is sometimes desirable to obtain a steady output, when pulses are applied to the input. This can be done by utilizing a rectifier or suitable filter circuit or integrating circuit on the output.

FIGURES 13 and 13a illustrate one such circuit for obtaining a steady or stretched output. Referring now to FIGURE 13 there is shown a capacitor F connected across a load resistor $R_L$ of a magnetic amplifier to form an integrating network. This composite load $(R_L+F)$ is in turn connected in parallel with the output winding II of the magnetic amplifier. FIGURE 13 illustrates that this integrating circuit could be connected across the load winding II of any of the previously described magnetic amplifiers, and is particularly applicable to the amplifiers shown in FIGURES 2 and 10.

The operation of the circuit may be best understood by examining FIGURE 13a which shows a three winding magnetic amplifier A of the type already described in connection with FIGURES 2 and 10. Amplifier A comprises three windings I, II and III coupled to a magnetic core C. Windings I and III receive in the times allotted therefor (as previously described) the power and signal pulses respectively. Power pulses cause the core to be driven to plus flux saturation, plus $B_S$, and signal pulses cause the core to be driven to minus flux saturation, minus $B_S$. When the power pulse drives the core from minus $B_S$ to plus $B_S$ a change in flux will be generated which induces an output voltage across output winding II. This output voltage in turn is transmitted to the integrating circuit comprising resistor $R_L$ and capacitor F. Although FIGURE 13a illustrates the power winding I and the signal winding III being driven from constant current sources of the type shown and described in connection with FIGURE 4 it will be appreciated that this magnetic amplifier and the integrating circuit comprising resistor $R_L$ and capacitor F would operate equally as well if the magnetic amplifier were driven by voltage sources (see FIG. 5).

In operation magnetic amplifier A produces an output pulse across winding II after a signal has been applied to winding III. The output pulse developed to some degree depends on the quality of the applied input signal of winding III. If the time integral of the signal is less than $2\times10^{-8}$ $B_R$AN volts then a full output will not be developed in response to the voltage applied to winding I. However, if the time integral of the applied input signal is equal or greater than the requisite volt seconds to entirely flip the core (i.e. drive the core to minus flux saturation, minus $B_S$), then when the voltage is applied to winding I a full standard output pulse will be developed across output winding II as the core experiences a traversal of its hysteresis loop. This output pulse will of course operate on the composite load (i.e. the integrating circuit comprising resistor $R_L$ and capacitor F) and a steady or stretched output from amplifier A will be obtained. If it is desired to reduce the steady output to zero, the input pulses to the amplifier are removed. It may take several pulse periods for the charge to leak off capacitor F. If a faster decay is desired, a clamp pulse could be applied to the output to reduce the output rapidly to zero.

Another circuit which may be used to obtain a stretched output is shown in FIGURES 14 and 14a. Referring to FIGURE 14 there is shown a delay line D coupled in parallel to the output winding II of a magnetic amplifier. Again this figure illustrates that the pulse stretching apparatus could be coupled across the load winding II of any of the magnetic amplifiers previously described.

Referring now to FIGURE 14a there is shown a three winding magnetic amplifier $A^1$ of the type just described connected at its output winding II via a plurality of diodes $D_1$, $D_2$ and $D_3$ to the taps of a lumped parameter delay line D which is terminated by its characteristic impedance $R_L$. The delay line makes use of the propagation time from the various points on the delay line to the output to increase the length of the pulse. In an amplifier which operates on a 50–50 duty cycle, i.e., one in which the signal period and power period are of equal length, only two diodes would be necessary. The delay time between the two diodes would be equal to the length of either the signal or power periods. By the time the main output pulse injected at the output end of the delay line would have died down, the pulse from the diode down the transmission line, which is delayed by a time equal to the power pulse period, will have arrived at the output, and it will last for a period equal to the signal period. Therefore, a steady output will be obtained when pulses are applied to the delay line. This type of circuit has the advantage of a much more rapid fall time than the capacitor circuit shown in FIGURE 13 and, in general, no reset pulse will be required with this type of circuit.

Of course, where the pulse periods are not the same, for example, where the power period is shorter than the signal period, the same type of circuit could be used. However, it would be necessary to use more than two diodes. In the circuit of FIGURE 14a, three diodes are shown. This could be used for any signal period length up to the point where the signal period is twice the power period. It is evident how this principle can be extended to include duty cycles of any ratio.

While specific embodiments have been described in detail to illustrate the principles of the invention, many modifications and variations for applying such principles in other arrangements, but which will not depart materially from the spirit of the invention, will be apparent to those skilled in the art.

What is claimed is:

1. A magnetic device comprising a magnetic core, a biasing coil coupled to said core, an input coil coupled to said core, means for applying direct current to said biasing coil to produce magnetic flux in one direction, means for applying a signal to said input coil to produce magnetic flux in an opposing direction, an output coil coupled to said core, and an integrating circuit coupled to said output coil.

2. A magnetic device comprising a magnetic core, a biasing coil coupled to said core, an input coil coupled to said core, means for applying direct current to said biasing coil to produce magnetic flux in one direction, means for applying a pulse waveform to said input coil to produce magnetic flux in an opposing direction, an output coil coupled to said core, and an integrating circuit coupled to said output coil, said integrating circuit having a discharge time longer than the duration of the pulses in said waveform.

3. In a parallel magnetic amplifier comprising a core of ferromagnetic material, a winding coupled to said core, means coupled to said core for driving said ferromagnetic material to a first or second state of magnetic remanence and for inducing a predetermined output across said winding when said ferromagnetic material is driven from said first state to said second state, a load circuit coupled in parallel to said winding wherein said load circuit includes a resistor and capacitor connected in parallel, and a unilateral conductor interposed between said winding and said load circuit.

4. In a parallel magnetic amplifier comprising a core of ferromagnetic material, a winding coupled to said core, means coupled to said core for driving said ferromagnetic material to a first or second state of magnetic remanence and for inducing a predetermined output across said winding when said ferromagnetic material is driven from said first state to said second state, a load circuit coupled in parallel to said winding, said load circuit including a plurality of unilateral conductors, a delay line and an impedance element wherein said unilateral conductors are connected between one end of said winding and different points on said delay line and said impedance is connected to the end of said delay line.

5. In combination, a core of ferromagnetic material, a first, a second and a third electric winding associated with said core, a source of power pulses connected to said first winding, a load circuit coupled across said second winding, said load circuit comprising an impedance and a capacitor connected in parallel, a unilateral conductor connected in series between said load circuit and said second winding and a source of signal pulses connected to said third winding.

6. In combination, a core of ferromagnetic material, a first, a second and a third electric winding associated with said core, a source of power pulses connected to said first winding, a source of signal pulses connected to said third winding, and a load circuit coupled across said second winding, said load circuit comprising a plurality of unilateral conductors, a delay line and an impedance element wherein said unilateral conductors are connected between one end of said second winding and different points on said delay line and said impedance is connected to the end of said delay line.

References Cited in the file of this patent

UNITED STATES PATENTS

| | | |
|---|---|---|
| 2,375,609 | Zühlke | May 8, 1945 |
| 2,652,501 | Wilson | Sept. 15, 1953 |
| 2,654,080 | Browne | Sept. 29, 1953 |
| 2,673,337 | Avery | Mar. 23, 1954 |

UNITED STATES PATENT OFFICE
CERTIFICATE OF CORRECTION

Patent No. 3,097,304      July 9, 1963

John Presper Eckert Jr., et al.

It is hereby certified that error appears in the above numbered patent requiring correction and that the said Letters Patent should read as corrected below.

Column 1, line 23, for "tsignal" read -- signal --; column 2, line 33, after "output" insert -- winding --; column 3, line 61, for "inmus" read -- minus --; column 4, line 6, for "step" read -- steep --; line 16, for "and" read -- or --; column 5, line 55, before "source", first occurrence, insert -- power --; column 9, line 4, for "A1" read -- A' --.

Signed and sealed this 21st day of April 1964.

(SEAL)  
Attest:  
ERNEST W. SWIDER

Attesting Officer

EDWARD J. BRENNER

Commissioner of Patents